United States Patent
Takagi et al.

(10) Patent No.: US 6,659,405 B1
(45) Date of Patent: Dec. 9, 2003

(54) OPERATION PANEL REVERSING MECHANISM FOR ON-VEHICLE SOUND EQUIPMENT

(75) Inventors: Manabu Takagi, Shibuya-ku (JP); Takashi Nakamura, Shibuya-ku (JP); Masayoshi Aoki, Shibuya-ku (JP)

(73) Assignee: Kabushiki Kaishi Kenwood, Tokyo (JP)

( * ) Notice: Subject to any disclaimer, the term of this patent is extended or adjusted under 35 U.S.C. 154(b) by 0 days.

(21) Appl. No.: 09/763,874

(22) PCT Filed: Jun. 29, 2000

(86) PCT No.: PCT/JP00/04314
§ 371 (c)(1),
(2), (4) Date: Feb. 28, 2001

(87) PCT Pub. No.: WO01/00451
PCT Pub. Date: Jan. 4, 2001

(30) Foreign Application Priority Data

Jun. 29, 1999 (JP) .............................................. 11-182752

(51) Int. Cl.[7] .................................................. G12B 9/00
(52) U.S. Cl. ............................................. 248/27.1; 296/70
(58) Field of Search ........................ 248/27.1; 340/425.5, 340/426; 381/86; 455/352, 346; 379/58; 361/814; 180/90; 296/70, 72, 73

(56) References Cited

U.S. PATENT DOCUMENTS 5,982,637 A * 11/1999 Noguchi ..................... 361/814
6,147,596 A * 11/2000 Tsuchiya .................. 340/425.5
6,474,431 B1 * 11/2002 Baker et al. .................. 180/90

FOREIGN PATENT DOCUMENTS

| JP | 06-029947 |   | 4/1994 |
| JP | 9-123842 | * | 5/1997 |
| JP | 9-267699 | * | 10/1997 |
| JP | 10-16653 | * | 1/1998 |
| JP | 10-114247 |   | 5/1998 |
| JP | 10-313179 | * | 11/1998 |
| JP | 11-213646 | * | 8/1999 |
| JP | 11-232858 | * | 8/1999 |
| JP | 2002-254991 A | * | 9/2002 |

* cited by examiner

*Primary Examiner*—Gwendolyn Baxter
(74) *Attorney, Agent, or Firm*—Eric J. Robinson; Robinson Intellectual Property Law Office, P.C.

(57) ABSTRACT

An operation panel turnabout mechanism for vehicle mount audio equipment is provided which is simple and allows an operation panel to be prevented from being stolen without removing it. A panel supporting member 6 which rotatably supports an operation panel 1 is provided to freely project from a housing and urged in the direction of projection using elasticity of a spring 14. The operation panel 1 is manually made to face backward with the panel supporting member 6 projected from the housing, and the panel supporting member 6 is moved back against elasticity of the spring 14 to allow the operation panel 1 to be installed on the front surface of the housing when the operation panel 1 faces backward.

7 Claims, 8 Drawing Sheets

(a)

(b)

(a)

(b)

(a)

(b)

(a)

(b)

(a)

(c)

(b)

(d)

(a)

(b)

(c)

(a)

(b)

(c)

OPERATION PANEL REVERSING MECHANISM FOR ON-VEHICLE SOUND EQUIPMENT

TECHNICAL FIELD

The present invention relates to vehicle mount audio equipment, and more particularly, to an operation panel turnabout mechanism for vehicle mount audio equipment which is useful for concealing the equipment to prevent it from being stolen when the user leaves the vehicle.

BACKGROUND ART

A mechanism is known which prevents vehicle mount audio equipment from being stolen by concealing it when the user leaves the car. FIG. 8 is a perspective view of an example of a conventional mechanism which prevents vehicle mount audio equipment from being stolen.

In the figure, an operation panel 1 is rotatably supported by a fixed arm 17, which is secured to a housing, and urged by a spring, not shown, to rotate forward. As shown in FIG. 8(a), the operation panel 1 covers the front of the housing when in use. In this state, the operation panel 1 is retained against spring elasticity by a lock mechanism, not shown, as shown in the figure.

When a panel open button 1a is pressed in the state shown in FIG. 8(a), lock of the operation panel by the lock mechanism is released, so that the operation panel 1 falls forward as shown in FIG. 8(b). In this state, the operation panel 1 can be removed as shown in FIG. 8(c), thus allowing the vehicle mount audio equipment to be prevented from being stolen by bringing the operation panel 1 out of the vehicle when he or she leaves the vehicle.

The above-described conventional mechanism requires an operation panel to be removed and brought out to prevent vehicle mount audio equipment from being stolen. This is troublesome and may cause the operation panel to be lost. Moreover, the back of the operation panel cannot be used for various kinds of displays.

As a mechanism for preventing the vehicle mount audio equipment from being stolen without removing the operation panel, the applicant has proposed a drive mechanism which drives the operation panel to conceal the vehicle mount audio equipment by turning over the panel in such a manner that the panel faces backward.

In Japanese Patent Application No. 7-303412 (Japanese Patent Application Laid-Open No. 9-123842), the applicant proposed vehicle mount audio equipment, in which a lever which is rotatably installed on the audio equipment body supports an operation panel at the side ends thereof via a shaft so that the panel rotates freely, a first gear is secured to the operation panel so that the shaft is at the center thereof, a second gear is rotatably supported on a shaft which is provided in the middle of the lever, and a third gear is secured to the audio equipment body so that the center of rotation of the lever is at the center thereof, the first and second gears are engaged with each other, the second and third gears are engaged with each other, and the lever is rotationally driven.

The operation panel drive mechanism, which rotates the operation panel about the shaft at the end of the panel with the gears, has a problem that, since gravity applied to the operation panel acts as a load to a driving torque of the gears, the transmission torque of the driving mechanism increases, so that the apparatus becomes large-scale.

Another problem with the mechanism is that the operation panel is at a substantially middle level, thus preventing a large space from being provided for recording medium insertion and discharge when the operation panel takes a horizontal position to open a rear recording medium inlet, because the shaft about which the operation panel rotates moves in an arc about the axis of a chassis and the ratio of the speed of the shaft to the speed of rotation of the operation panel is constant.

In Japanese Patent Application No. 8-103935 (Japanese Patent Application Laid-Open No. 9-267699), the applicant proposed a vehicle mount audio equipment, wherein a lever which supports a shaft at the end of the operation panel of the vehicle mount audio equipment is rotatably supported by a lever which, in turn, is rotatably supported by a chassis, and an operation panel is let to rotate about a shaft, using gears secured to the operation panel while these two levers are rotated.

Such a structure allows a large space to be provided for recording medium insertion and discharge, with the operation panel positioned below when the operation panel takes a horizontal position to open a rear recording medium inlet.

However, as is the case with the above-described mechanism, torque for rotating the operation panel about the shaft at its end using the gears is large. An additional problem with the vehicle mount audio equipment is that the mechanism is large and complex, because the lever supporting the operation panel is rotatably supported by the other lever.

SUMMARY OF THE INVENTION

It is an object of the present invention, which was made in light of the foregoing, to provide an operation panel turnabout mechanism for vehicle mount audio equipment which is simple and allows vehicle mount audio equipment to be prevented from being stolen without removing the operation panel.

In an operation panel turnabout mechanism for vehicle mount audio equipment of the present invention, a panel supporting member which rotatably supports an operation panel is provided to freely project from a housing and urged in the direction of projection using elasticity of a spring, the operation panel is manually made to face backward with the panel supporting member projected from the housing, and the panel supporting member is moved back against elasticity of the spring to allow the operation panel to be installed on the front surface of the housing when the operation panel faces backward.

The operation panel turnabout mechanism for vehicle mount audio equipment is adapted so that the panel supporting member rotates, thus projecting from the housing and that a convexity provided in the operation panel is guided along a guide slit in the housing or a member secured to the housing.

In an operation panel turnabout mechanism for vehicle mount audio equipment of the present invention, an operation panel supporting member which rotatably supports an operation panel is rotatably supported on a housing, the operation panel supporting member is manually rotated by rotating the operation panel in such a direction that the panel moves away from the housing to face the operation panel backward and then the operation panel is rotated toward the housing to allow the operation panel to be installed on the front surface of the housing when the operation panel faces backward.

DESCRIPTION OF THE EMBODIMENTS

Figure 1:
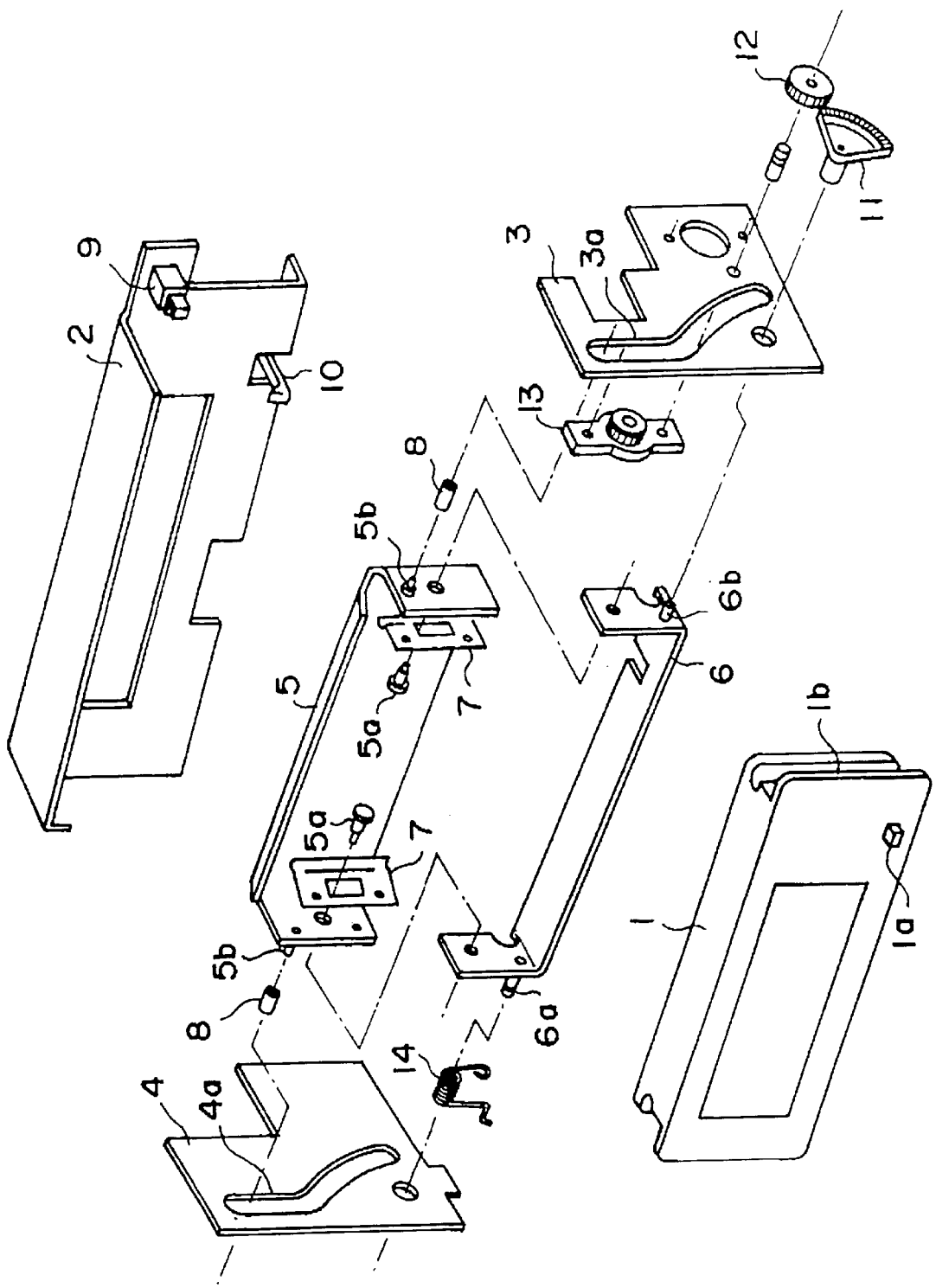
FIG. 1 is an exploded perspective view of a first embodiment of the present invention, or a panel turnabout mechanism for vehicle mount audio equipment.
Figure 2:
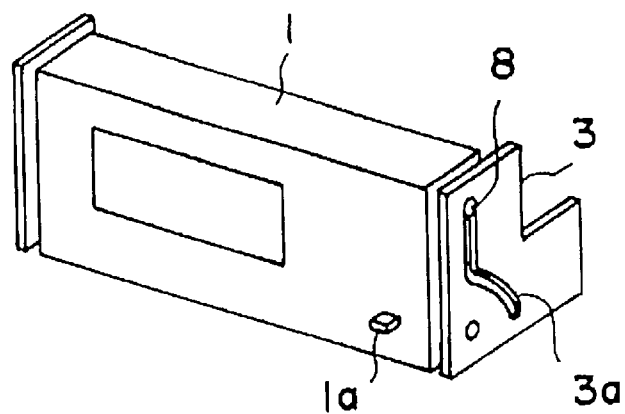
FIGS. 2(a) and 2(b) are a perspective view and a side view showing the panel turnabout mechanism, respectively.
Figure 2:
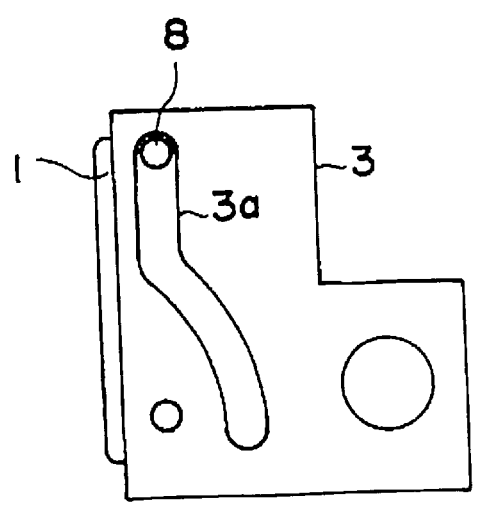
Figure 3:
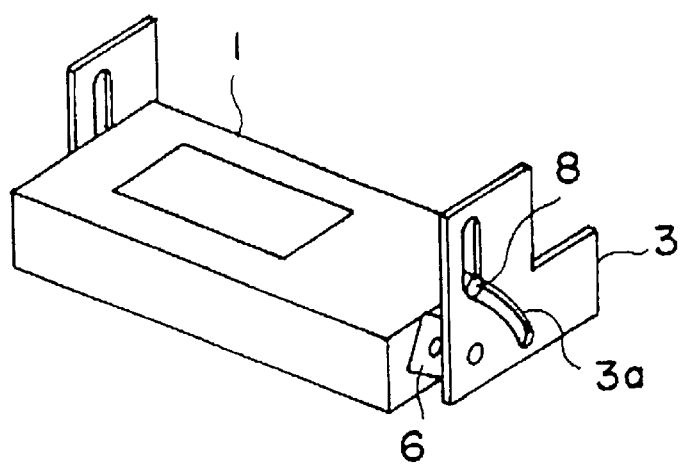
FIGS. 3(a) and 3(b) are a perspective view and a side view showing the panel turnabout mechanism in another condition, respectively.
Figure 3:
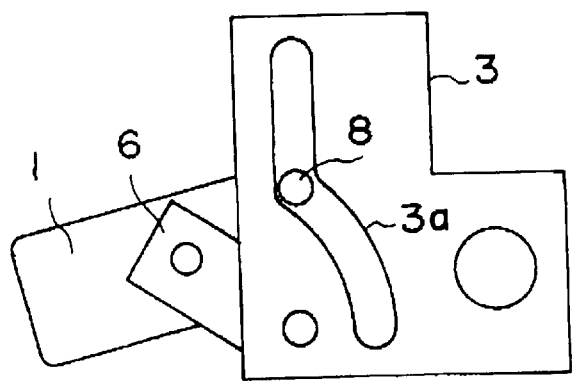
Figure 4:
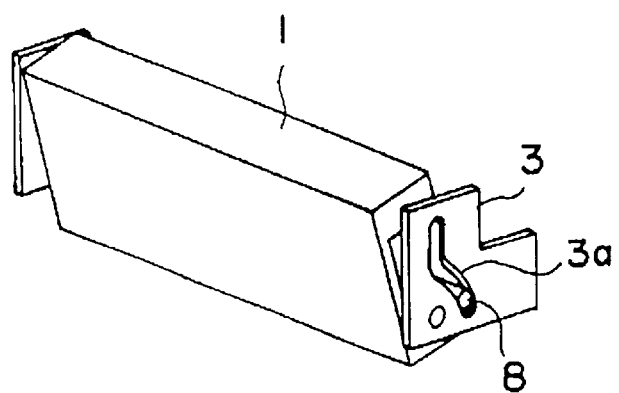
FIGS. 4(a) and 4(b) are a perspective view and a side view showing the panel turnabout mechanism in still another condition, respectively.
Figure 4:
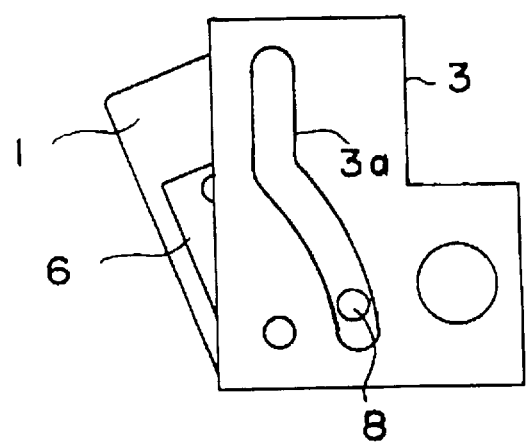

Referring now to the drawings, an embodiment of the present invention, or an operation panel turnabout mechanism for vehicle mount audio equipment will be described below. FIG. 1 is an exploded perspective view of a first embodiment of the present invention, or an operation panel turnabout mechanism for vehicle mount audio equipment.

As shown in the figure, a rear base plate 2 the front surface of which is a panel mounting face, a right base plate 3, and a left base plate 4 are secured to a housing body and are parts of the housing in this specification. A panel supporting member 6 is supported by supporting shafts 6a and 6b, provided in an upright position on the member, through the left and right base plates 4 and 3, respectively so that the member can rotate with respect to the housing. A torsion coil spring 14 urges the panel supporting member 6 counterclockwise, as viewed from the lower right corner of the figure.

A main gear 11 is secured to the shaft 6b, so that the gear is integrated with the panel supporting member 6. An idler gear 12 is rotatably supported by the right base plate 3 and engaged with the main gear 11 and a gear damper 13, which is installed to the right base plate 3. When the panel supporting member 6 rotates due to elasticity of the torsion coil spring 14, the gear damper 13 rotates, thus reducing the speed of rotation of the panel supporting member 6.

An operation panel 1 is clamped by a panel bracket 5 through leaf springs 7, 7, so that the panel is integrated with the panel bracket 5. Shafts 5a, 5a, which are provided in an upright position on the panel bracket 5, each fit 5 into holes in the panel supporting member 6. The panel bracket 5 and operation panel 1 are rotatably supported by the panel supporting member 6 through the shafts 5a, 5a.

Rollers 8, 8 which are fit over shafts 5b, 5b provided in an upright position on the panel supporting member 6 pass through guide slits 3a and 4a in the right and left base plates 3 and 4, respectively, thus limiting the position of rotation of the panel bracket 5 with respect to the panel supporting member 6.

A lock arm 10 which is installed to the rear base plate 2 locks the lower part of the operation panel 1 when the operation panel 1 as shown in FIG. 1 faces forward. A push lock 9 which is installed to the rear base plate 2 locks a lip 1b of the operation panel 1 provided on the operation panel 1 when the panel faces backward. Pressing a panel open button 1a provided on the operation panel 1 causes the lock by the lock arm 10 to be released. Pushing the operation panel 1 causes the lock by the push lock 9 to be released.

Referring now to FIGS. 2 through 5, operation of the above-described operation panel turnabout mechanism will be described below. FIGS. 2(a) and 2(b) show the mechanism in normal operating condition. As described above, the lower part of the operation panel 1 is retained by the lock arm 10. In this state, pressing the panel open button 1a causes the lock by the lock arm 10 to be released, thus allowing the lower part of the operation panel 1 to project forward.

Then slanting the operation panel 1 so that the lower part of the operation panel 1 projects forward, the panel supporting member 6 rotates forward due to elasticity produced by the torsion coil spring 14. The angle of slant of the operation panel 1 is determined by the rollers 8, which are guided by the guide slits 3a and 4a.

FIGS. 3(a) and 3(b) show the panel supporting member 6 which has rotated forward. Here there is a wide space above the operation panel 1, so that a recording medium can be inserted into, or discharged from, the housing. To turn over the operation panel 1, it should be pushed toward the housing, being rotated clockwise when the panel is as shown in FIGS. 3(a) and 3(b).

FIGS. 4(a) and 4(b) show the operation panel 1 as it is being pushed as described above. Pushing the operation panel 1 toward the housing while rotating the operation panel 1 counterclockwise allows the panel to be returned to the condition in FIGS. 2(a) and 2(b).

In mechanical association with a first operation where the supporting member 6 rotates about the shaft 6a, the roller 8 moves in a slit 3a so that the panel is positioned perpendicular to the panel mounting face of the housing, as shown by FIGS. 3(a), 3(b). In mechanical association with a second operation where the panel is further rotated by a force exerted onto the panel, the roller moves in a slit 3a to guide the panel so that the panel is overturned, as shown FIGS. 4(a), 4(b). The above guide manner is also conducted reversibly when the overturned panel is returned to the normal state.

Figure 5:
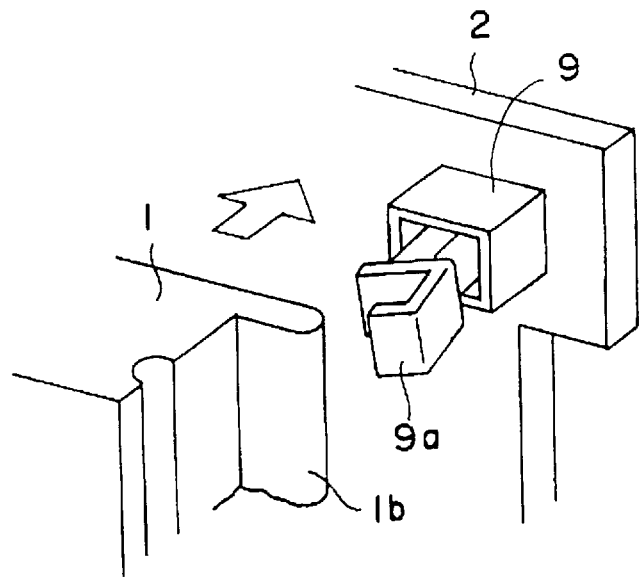
FIG. 5(a) is a perspective view showing part of the panel turnabout mechanism.
FIG. 5(b) is a side view showing the part in another condition.
Figure 5:
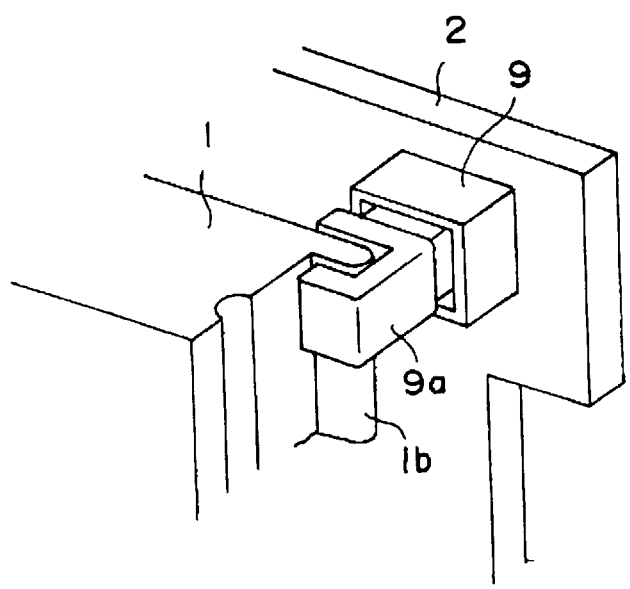

Rotating the operation panel 1 counterclockwise as described above allows the operation panel 1 to be installed on the front surface of the housing when it faces backward. Referring now to FIG. 5, lock condition will be described below which is achieved when the operation panel 1 is installed on the front surface of the housing. FIG. 5(a) shows the operation panel 1 as observed immediately before the panel is installed on the front surface of the housing when the panel faces backward. Here a retainer 9a of the push lock 9 rotates counterclockwise as viewed from above.

Pushing the operation panel 1 causes the retainer 9a of the push lock 9 to slightly move back and rotate clockwise, so that the operation panel is locked. Then releasing the locked operation panel 1 causes the retainer 9a to slightly move forward. However, the retainer keeps locking the operation panel 1, thus retaining the lip 1b of the operation panel 1 as shown in FIG. 5(b), so that the operation panel 1 is kept faced backward.

Pressing the operation panel 1 as shown in FIG. 5(b) causes the retainer 9a to slightly move back and rotate counterclockwise, thus unlocking the operation panel. When unlocked, the operation panel 1 slants due to elasticity of the torsion coil spring 14 until the panel reaches the position in FIGS. 3(a) and 3(b). A push lock is commercially available which shuts when pressed and opens when repressed.

It is apparent from the foregoing description that the operation panel 1 can be made to face forward as shown in FIGS. 2(a) and 2(b) and face backward as shown in FIGS. 4(a) and 4(b), starting in the condition in FIGS. 3(a) and 3(b).

Because the above-described embodiment does not require the operation panel to be removed to prevent the panel from being stolen when it faces backward, it is not likely to lose the panel. The embodiment moves the operation panel to produce a wide space above the operation panel, thus complicating the path of the operation panel. However, because the operation panel is manually moved, the mechanism is simplified, and a wide space is provided for recording medium insertion and discharge.

Figure 6:
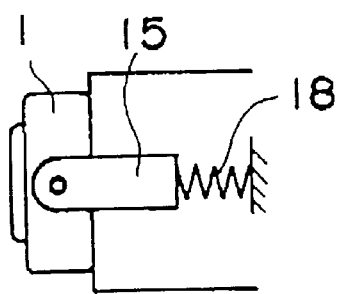
FIGS. 6(a)–(d) are side views showing a structure of a second embodiment of the present invention, or a panel turnabout mechanism for vehicle mount audio equipment.
Figure 6:
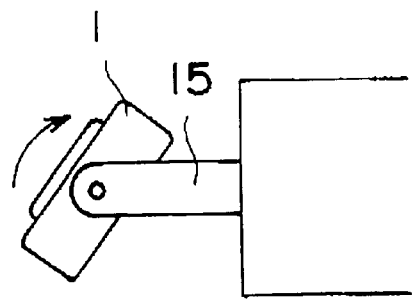
Figure 6:
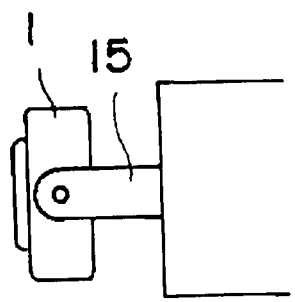
Figure 6:
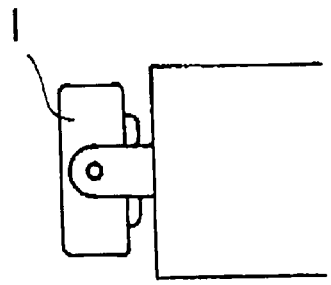

FIG. 6 is a schematic side view showing the structure of a second embodiment, or a panel turnabout mechanism for vehicle mount audio equipment. In the embodiment, a panel supporting member 15 is supported on a housing so that the member freely projects and urged in the direction of projection by a spring 18. The panel supporting member 15 supports the operation panel 1 so that the panel freely rotates.

FIG. 6(a) shows the operation panel 1 as installed on the front surface of the housing when the panel faces forward. The operation panel 1 is locked by a lock mechanism, not shown. When the lock mechanism is unlocked, the panel supporting member 15 is pushed out due to elasticity of the spring 18 as shown in FIG. 6(b).

Then the operation panel 1 can manually be faced backward as shown in FIG. 6(c). After faced backward, the operation panel 1 can manually be pushed in to install the operation panel 1 on the front surface of the housing when the panel faces backward. The operation panel 1 is also locked by a lock mechanism, not shown.

Because the above-described embodiment does not require the operation panel to be removed to prevent the panel from being stolen when it faces backward, it is not likely to lose the panel. Because the operation panel is manually move, the mechanism is simplified.

Figure 7:
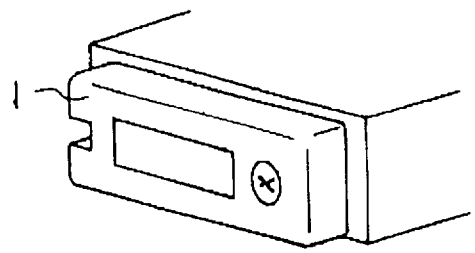
FIGS. 7(a)–(c) are perspective views showing a third embodiment of the present invention, or a panel turnabout mechanism for vehicle mount audio equipment.
Figure 7:
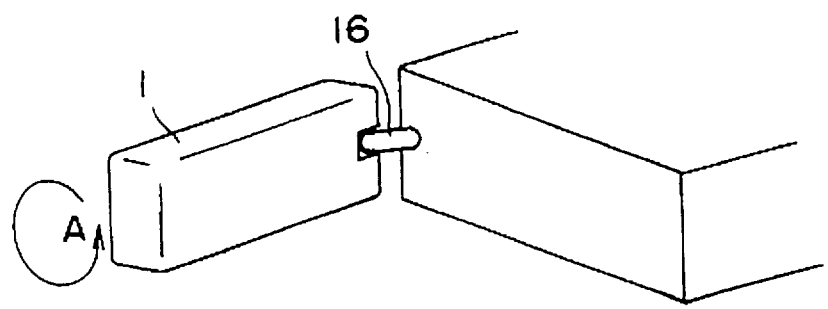
Figure 7:
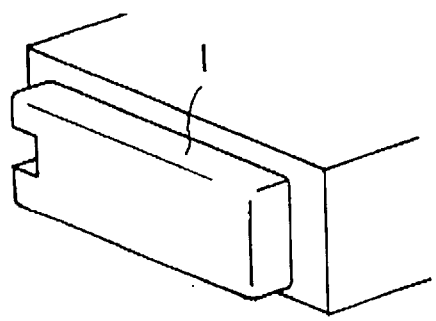
Figure 8:
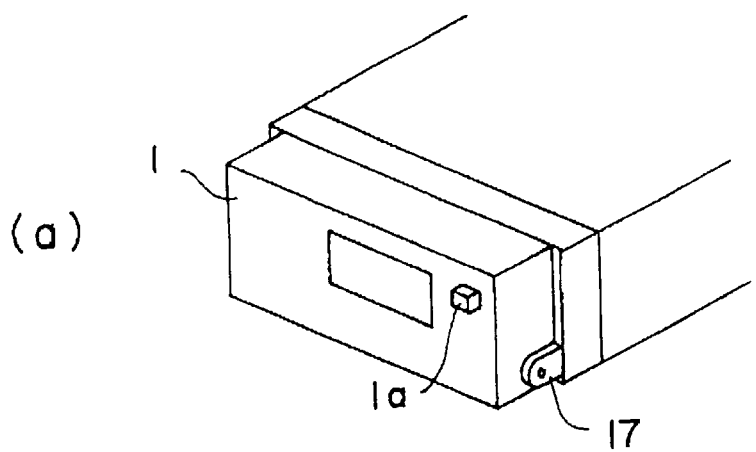
FIGS. 8(a)–(c) are perspective views showing an example of a conventional mechanism which prevents vehicle mount audio equipment from being stolen.
Figure 8:
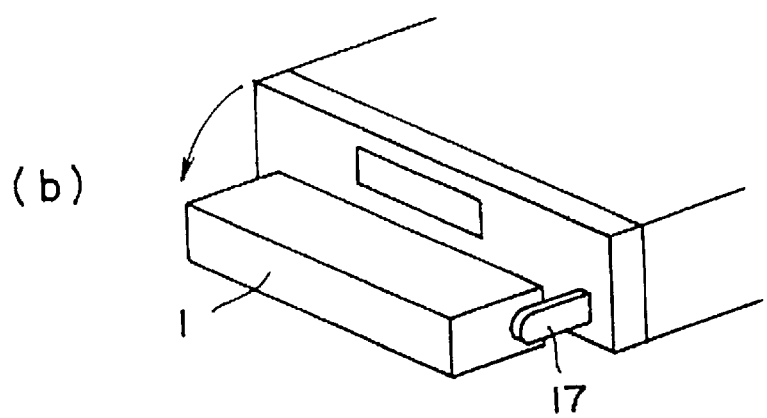
Figure 8:
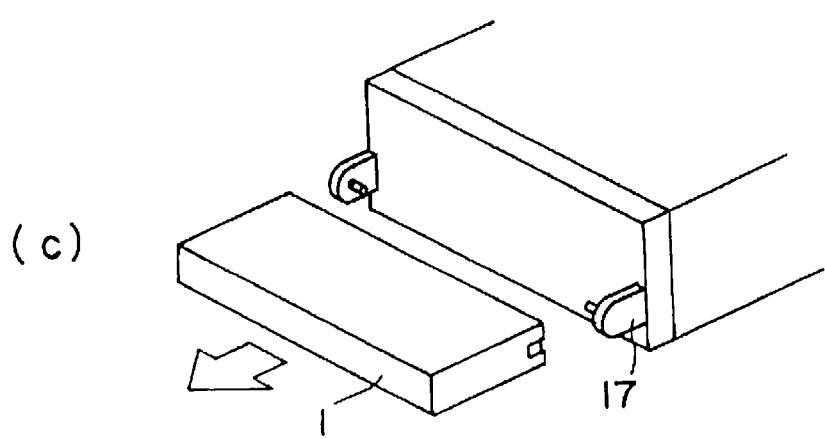

FIG. 7 shows a third embodiment of the present invention, or a panel turnabout mechanism for vehicle mount audio equipment. In the embodiment, a panel supporting member 16 is supported on a housing so that the member freely rotates about an axis. The member supports the operation panel 1 so that it freely rotates.

FIG. 7(a) shows how audio equipment is used. In the figure, the operation panel 1 is installed on the front surface of a housing when the panel faces forward. In this state, the operation panel 1 is locked by a lock mechanism, not shown.

When the lock mechanism is unlocked, the operation panel 1 is rotated due to elasticity of a spring, not shown, so that the panel moves away from the front of the housing as shown in FIG. 7(b). After the operation panel 1 is rotated 180° in a direction A in the figure together with the panel supporting member 16, rotating the operation panel 1 toward the front of the housing allows the operation panel 1 to be installed on the front surface of the housing when the panel faces backward as shown in FIG. 7(c). The operation panel 1 is also locked by a lock mechanism, not shown.

Because the above-described embodiment does not require the operation panel to be removed to prevent the panel from being stolen when it faces backward, it is not likely to lose the panel. Because the operation panel is manually moved, the mechanism is simplified, and a wide space is provided for recording medium insertion and discharge.

INDUSTRIAL APPLICABILITY

An operation panel turnabout mechanism for vehicle mount audio equipment of the present invention allows two types of operation panels on the back of which a display is provided to be used. If an operation panel whose back is blank is used, the panel can be made to face backward without removing it, thus preventing it from being stolen, so that it is not likely to lose the panel.

Because the operation panel is manually moved, no motor is needed, the mechanism is simplified, and its manufacturing cost is reduced. Moreover, because of the simple mechanism, a narrower space is needed, and the equipment is reduced in weight.

What is claimed is:

1. A panel operation mechanism comprising:

a support member, one end of which is mounted to a housing on a first rotation axis;

a spring for biasing said support member about said first rotation axis in a first rotation direction;

a panel mounted to the other end of said support member on a second rotation axis;

a guide of engagement mechanism between said housing and said panel, for guiding said panel to be parallel to a panel mounting face of said housing when said support member is positioned parallel to the panel mounting face of said housing; and a lock member for locking said support member against the bias force by said spring, wherein, when the lock member is released, in mechanical association with a first support member rotating operation where said support member rotates about the first rotation axis in the first rotation direction by the bias force of said spring to be positioned perpendicular to the panel mounting face of said housing, said guide conducts a first operation to guide a first movement of said panel to rotate about the second rotation axis in a second rotation direction reverse to the first rotation direction so that the panel is positioned perpendicular to the panel mounting face of said housing, wherein in mechanical association with a first panel rotating operation where said panel is further rotated in the second rotation direction by a force exerted when said panel is positioned perpendicular to the panel mounting face of said housing, said guide conducts a second operation to guide a second movement of said panel to be positioned parallel to the panel mounting face of said housing in a turnabout state.

2. A panel operation mechanism according to claim 1, wherein, when the lock member is released under a condition where said panel is positioned parallel to the panel mounting face of said housing in the turnabout state, in mechanical association with a second support member rotating operation where said support member is rotated about the first rotation axis in the first rotation direction by the bias force of said spring to be positioned perpendicular to the panel mounting face of said housing, said guide conducts a third operation to guide a third movement of said panel so that said panel is positioned to be perpendicular to the panel mounting face of said housing.

3. A panel operation mechanism according to claims 1 or 2 wherein in mechanical association with a second panel rotating operation where said panel is rotated about the second rotation axis in the first rotation direction by a force exerted when said panel is positioned perpendicular to the panel mounting face of said housing, said guide conducts a fourth operation to guide a fourth movement of said panel to be positioned parallel to the panel mounting face of said housing in a normal state.

4. A panel operation mechanism according to claim 1, wherein said guide comprises a pin provided on the sidewall of said panel and a guide slot provided on said housing, the pin being inserted in the guide slot.

5. A panel operation mechanism according to claim 1, wherein said first rotation axis is provided at the upper or lower end of the panel mounting face of said housing and said second rotation axis is provided at the center of the sidewall of said panel.

6. A panel operation mechanism according to claim 1, wherein said panel comprises an operation panel and panel bracket, the operation panel being attached to the panel bracket.

7. A panel operation mechanism according to claim 6, wherein said operation panel is removably attached to the panel bracket.

* * * * *